F. REINSCHMIDT.
TOWING DEVICE.
APPLICATION FILED APR. 19, 1921.
1,428,860.
Patented Sept. 12, 1922.
2 SHEETS—SHEET 1.
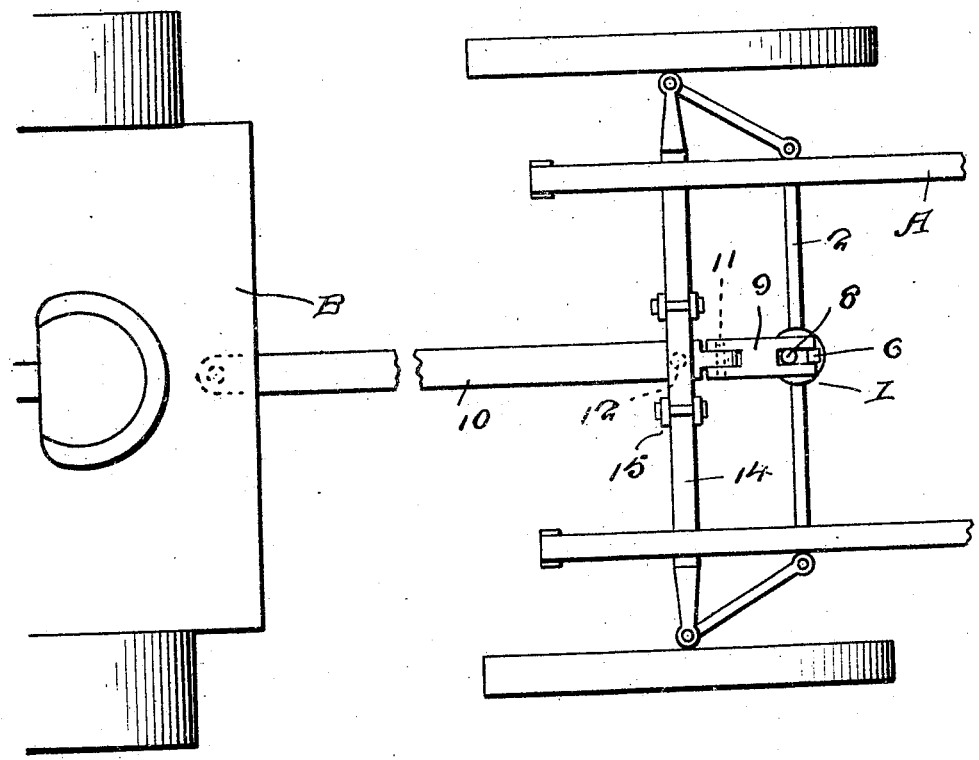
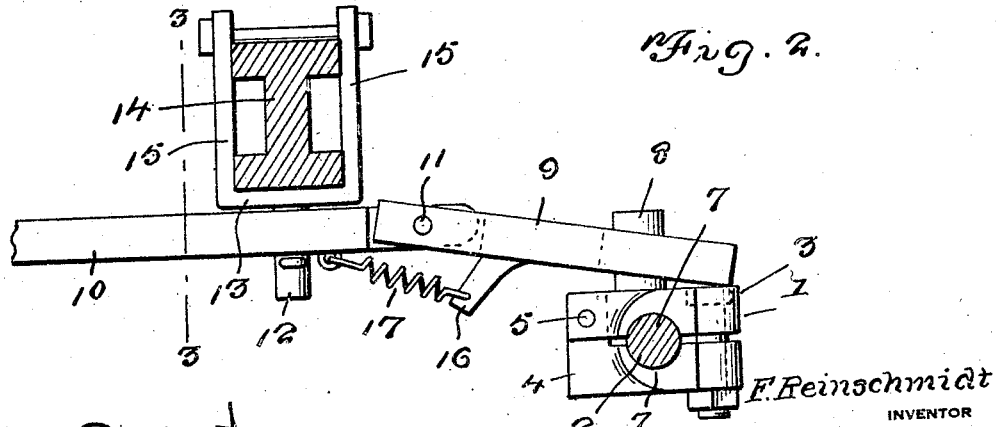
F. Reinschmidt
INVENTOR
BY Victor J. Evans
ATTORNEY
WITNESS:

F. REINSCHMIDT.
TOWING DEVICE.
APPLICATION FILED APR. 19, 1921.
1,428,860.
Patented Sept. 12, 1922.
2 SHEETS—SHEET 2.
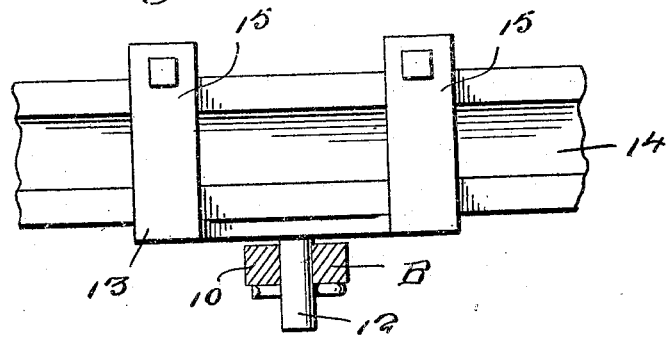
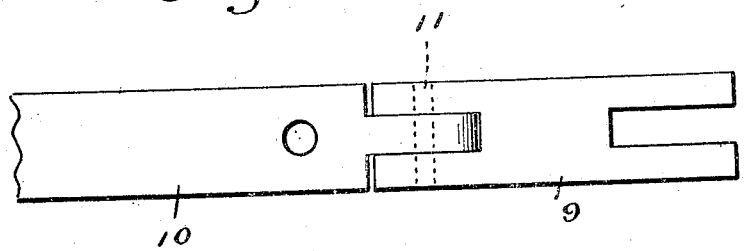
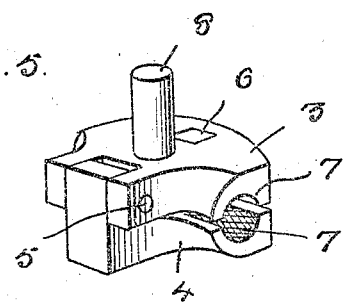
F. Reinschmidt
INVENTOR
BY Victor J. Evans
ATTORNEY Patented Sept. 12, 1922.

1,428,860

UNITED STATES PATENT OFFICE.

FRANK REINSCHMIDT, OF CROOKSTON, MINNESOTA.

TOWING DEVICE.

Application filed April 19, 1921. Serial No. 462,593.

*To all whom it may concern:*

Be it known that I, FRANK REINSCHMIDT, a citizen of the United States, residing at Crookston, in the county of Polk and State of Minnesota, have invented new and useful Improvements in Towing Devices, of which the following is a specification.

This invention relates to an attachment for automobiles and the like, the principal object of the invention being to provide means for permitting a vehicle to be towed without being steered, thus rendering it unnecessary to have a driver in the towed machine.

In carrying out the invention we provide means for connecting the connecting rod of the steering mechanism to the front axle in such a manner that the vehicle will automatically be caused to follow the towing car.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which :—

Figure 1 is a diagrammatic plan view showing one car being towed by another, the towed car being provided with my invention.

Figure 2 is an enlarged elevation of my device applied to a car, parts being shown in section.

Figure 3 is a section on line 3—3 of Figure 2.

Figures 4 and 5 are detail views.

As shown in these views the device comprises a clamp 1 for engaging the connecting rod 2 of the steering mechanism of the vehicle A which is to be towed. This clamp is formed of two members 3 and 4 which are hinged together as at 5 and which are adapted to be clamped upon the rod by the bolt 6. Each member is provided with a semi-circular groove 7 for receiving the connecting rod, the surfaces of these grooves being roughened so that they will grip the rod. The upper member 3 is provided with an upwardly extending stub 8 for engagement by one of the forked ends of the bar 9. The other forked end of this bar receives the reduced end of the lever 10, these parts being hingedly connected together by the pin 11 which passes through the said forked end and said reduced part of the lever. This lever is pivotally mounted on the stud 12; carried by bracket 13 which is secured to the front axle 14 by bolts which pass through the arms 15 at the ends of the bracket. Bar 9 is provided with a downwardly extending part 16 to which one end of a coil spring 17 is connected, the other end of the spring being connected with a part of the lever 10. This spring tends to hold the bar 9 upon the clamp 1.

The towing car B is connected in any desired manner with the lever 10 so that when the towing car makes a turn said lever will be rocked upon its pivot carried by the bracket so that the bar 9 will be shifted laterally. This movement will be communicated to the connecting rod of the towed car so that the front wheels of this towed car will be turned to cause said car to follow the towing car.

It will thus be seen that the rear car can be towed by another vehicle without requiring the service of another operator to steer the rear car.

It is thought from the foregoing description that the advantages and novel features of the invention will be readily apparent.

I desire it to be understood that I may make changes in the construction and in the combination and arrangement of the several parts, provided that such changes fall within the scope of the appended claim.

What I claim is :—

A towing device comprising a clamp consisting of upper and lower sections hingedly connected at one end thereof, its opposite end provided with apertures for the insertion of a connecting bolt, a serrated semicircular groove formed within each section and adapted to receive the connecting rod of the steering mechanism, an upwardly extending stud disposed upon the top of the upper section and projecting therefrom, a bar forked at its ends one end being adapted to receive said stud, a bracket provided with upwardly extending arms and adapted to be clamped upon the front axle of the towed vehicle, a stud projecting downwardly from the lower side of said bracket, a lever having a reduced end hingedly connected to the opposite forked end of said bar and provided near its reduced end with an aperture adapted to receive the last mentioned stud, a projection extending downwardly from the lower part of said bar adjacent its hinged end, a coil spring having its ends secured to said projection and lever respectively and means for fastening the opposite end of said lever to the towing vehicle.

In testimony whereof I affix my signature.

FRANK REINSCHMIDT.